(12) United States Patent
Licardie et al.

(10) Patent No.: US 9,544,046 B2
(45) Date of Patent: Jan. 10, 2017

(54) SYSTEMS AND METHODS FOR ADAPTIVE REPEATERS

(71) Applicant: Aviat U.S., Inc., Santa Clara, CA (US)

(72) Inventors: Sergio Licardie, Cupertino, CA (US); Rishipal Arya, San Jose, CA (US); Chun-Hao Chen, Newark, CA (US)

(73) Assignee: Aviat U.S., Inc., Santa Clara, CA (US)

( * ) Notice: Subject to any disclaimer, the term of this patent is extended or adjusted under 35 U.S.C. 154(b) by 0 days.

(21) Appl. No.: 14/465,714

(22) Filed: Aug. 21, 2014

(65) Prior Publication Data

US 2015/0055547 A1 Feb. 26, 2015

Related U.S. Application Data

(60) Provisional application No. 61/868,500, filed on Aug. 21, 2013.

(51) Int. Cl.
| | | |
|---|---|---|
| *H04B 7/155* | (2006.01) | |
| *H04B 7/15* | (2006.01) | |
| *H04W 88/06* | (2009.01) | |
| *H04B 7/14* | (2006.01) | |

(52) U.S. Cl.
CPC ............ *H04B 7/15557* (2013.01); *H04B 7/15* (2013.01); *H04B 7/1555* (2013.01); *H04B 7/14* (2013.01); *H04W 88/06* (2013.01)

(58) Field of Classification Search
CPC ......... H04B 7/14; H04B 7/15; H04B 7/15528; H04B 7/15535; H04B 7/1555; H04B 7/15557; H04B 7/2606; H04W 40/22; H04W 88/04; H04W 88/06
See application file for complete search history.

(56) References Cited

U.S. PATENT DOCUMENTS

| | | | | |
|---|---|---|---|---|
| 2002/0028655 | A1* | 3/2002 | Rosener | H04B 7/2606 455/16 |
| 2004/0204038 | A1* | 10/2004 | Suzuki | H04W 88/06 455/553.1 |
| 2006/0098592 | A1 | 5/2006 | Proctor, Jr. et al. | |
| 2013/0094554 | A1* | 4/2013 | Kennard | H04B 7/0613 375/222 |

OTHER PUBLICATIONS

Aviat Networks, Inc., "The Need for Speed: Best Practices for Building Ultra-Low Latency Microwave Networks," White Paper, Jul. 2012, pp. 1-9.
International Application No. PCT/US2014/052174, International Search Report and Written Opinion mailed Nov. 12, 2014.

* cited by examiner

*Primary Examiner* — Khoa Huynh
(74) *Attorney, Agent, or Firm* — Sheppard, Mullin, Richter & Hampton LLP

(57) ABSTRACT

In some embodiments, a first RF signal is received at a wireless repeater, a signal quality is determined based on the first RF signal, the signal quality is analyzed based on a parameter, an operation mode is auto selected based on analysis of the signal quality, and a second RF signal based on the first RF signal is generated for transmission according to the selected operation mode. Under one mode, a first RAC of the wireless may generate data based on a first IF signal downconverted from a first RF signal. Based on the data, a second RAC of the wireless repeater may generate a second IF signal, which can be used to generate a second RF signal for transmission. Under another mode, the first RAC may provide the IF signal to the second RAC, which provides the IF signal for generation of the second RF signal.

24 Claims, 7 Drawing Sheets

SYSTEMS AND METHODS FOR ADAPTIVE REPEATERS

CROSS-REFERENCE TO RELATED APPLICATIONS

The present application claims the benefit of U.S. Provisional Patent Application Ser. No. 61/868,500 filed Aug. 21, 2013 and entitled "Adaptive Fallback and Recovery of IF Repeaters in Low Latency Wireless Systems," which is incorporated by reference herein.

BACKGROUND

1. Field of the Invention(s)

The present invention(s) relate to wireless networks and, more particularly, wireless repeaters in a wireless network, such as a microwave network.

2. Description of Related Art

Wireless network signal repeaters (also referred to herein as wireless repeaters) are commonly utilized in various types of wireless networks, including microwave networks, and 802.11-based networks. In the context of microwave networks, wireless repeaters are useful in implementing point-to-point wireless network connections over long distances and over geographic areas that have line of sight-limiting obstacles (e.g., limited terrain clearance, such as in mountainous regions). Generally, a passive wireless repeater receives a wireless signal from a remote wireless transmitter and reflects the wireless signal to a remote wireless receiver using passive devices, such a parabolic antenna coupled to a waveguide. An active wireless repeater, on the other hand, comprises at least one wireless receiver (or transceiver) bridged to at least one wireless transmitter (or transceiver) such that the at least one wireless receiver can receive a first wireless signal from a remote wireless transmitter, and the at least one wireless transmitter can transmit to a remote wireless receiver a second wireless signal that is generated based on the first wireless signal received. In this way, the active repeater station can relay a wireless signal from the remote wireless transmitter to the remote wireless receiver, and can do so in situations where transmitting the wireless signal from the remote wireless transmitter to the remote wireless receiver would otherwise be difficult or impossible (e.g., due to distance, Earth curvature, terrain obstacles, etc.). Unfortunately, use of active or passive repeaters in a wireless signal path can introduce signal issues (e.g., signal loss or degradation) or result in undesirable effects, such as high latency with respect to communication of data over the wireless signal path.

SUMMARY OF EMBODIMENTS

Various embodiments provide for systems, methods, or apparatuses relating to wireless repeaters in a wireless network, such as a microwave network. For some embodiments, systems, methods, or apparatuses provided relate to a wireless repeater having at least two radio access cards (RACs), which may each be coupled to a radio frequency unit (RFU).

According to some embodiments, a first RF signal is received at a wireless repeater, a signal quality is determined based on the first RF signal, the signal quality is analyzed based on a set of parameters, and an operation mode of the wireless repeater is selected based on analysis of the signal quality. A second RF signal may generate at the wireless repeater based on the operation mode selected and the first RF signal. Depending on the embodiment, the first RF signal may be a microwave or millimeter wave signal and the second RF signal may be a microwave or millimeter wave signal.

In certain embodiments, before the selecting the operation mode of the wireless repeater, a transmitting radio frequency unit (RFU) of the wireless repeater may be muted, and after the selecting the operation mode of the wireless repeater, a transmitting radio frequency unit (RFU) of the wireless repeater may be unmuted.

For some embodiment, the operation mode comprises a first radio access card (RAC) of the wireless repeater providing an intermediate frequency (IF) signal (e.g., over an analog path) to a second radio access card (RAC) of the wireless repeater, the first RAC receiving the IF signal from a receiving radio frequency unit (RFU) that generates the IF signal based on the first RF signal. In some embodiments, the operation mode comprises a first radio access card (RAC) of the wireless repeater providing data (e.g., digital path) to a second radio access card (RAC) of the wireless repeater, the first RAC generating the data based on an intermediate frequency (IF) signal.

In some embodiments, determining the signal quality based on the first RF signal comprises monitoring a signal quality indicator (SQI) associated with the first RF signal. The receive SQI may comprise a radio signal level (RSL) (e.g., received signal strength indicator—RSSI), a signal-to-noise ratio (SNR), or bit error rate (BER). The SQI associated for the first RF signal may be one determined using an intermediate frequency (IF) signal that is based on the first RF signal (e.g., once the first RF signal is downconverted to the IF signal). The set of parameters may include whether the SQI violates a transmitter (TX) spectrum mask out, or whether the SQI is above or below a quality threshold.

Depending on the embodiment, a first radio access card (RAC) of the wireless repeater may receive an intermediate frequency (IF) signal from a receiving radio frequency unit (RFU) that generates the IF signal based on the first RF signal.

For some embodiments, under a particular operation mode (e.g., a regenerator mode), a first radio access card (RAC) of the wireless repeater receives a first intermediate frequency (IF) signal generated based on the first RF signal, the first RAC generates data based on the first IF signal, and based on the operating mode, a second radio access card (RAC) of the wireless repeater generates a second intermediate frequency (IF) signal based on the data. For example, a first RAC may receive a first IF signal from a receiving radio frequency unit (RFU) that generates the first IF signal based on the first RF signal, the first RAC may generate data based on the first IF signal, based on the operating mode, a second RAC of the wireless repeater may generate a second IF signal based on the data, and a transmitting radio frequency unit (RFU) may generate the second RF signal based on the second IF signal. When the second RAC generated a second IF signal based on the data, the second RAC may utilize at least some modem functionality, which may introduce some overall latency with respect to the wireless signal being relayed through wireless network signal repeater. Depending on the embodiment, the data provided by the first RAC to the second RAC may include a digital data stream generated based on the first IF signal, or one or more baseband signals generated based on the first IF signal.

For some embodiments, under a certain operation mode (e.g., an IF repeater mode), a first radio access card (RAC) receives a first IF signal, the first RAC provides the first IF signal to a second radio access card (RAC), and based on the operating mode, the second RAC provides the first intermediate frequency (IF) signal to a transmitting radio frequency unit (RFU) that generates the second RF signal based on the first IF signal. For instance, the first RAC of the wireless repeater may receive the first IF signal from a receiving radio frequency unit (RFU) that generates the first IF signal based on the first RF signal, based on the operating mode, the second RAC of the wireless repeater may provide the first IF signal to the transmitting RFU, and the transmitting RFU generates the second RF signal based on the first IF signal. In some embodiments, the second RAC may upconvert the first IF signal, or otherwise modify a characteristic of the first IF signal (e.g., amplitude), before the first IF signal is provided to the transmitting RFU.

According to some embodiments, a system is provided comprising: a receiving radio access card (RAC) configured to receive a first intermediate frequency (IF) signal and determine (or assist in the determination of) a signal quality of a first radio frequency (RF) signal based on the first IF signal. The system may further comprise a wireless repeater control module configured to analyze the signal quality based on a set of parameters and select an operation mode for the system based on the analyzing the signal quality. The receiving RAC may be further configured to generate data based on the first IF signal and provide the first IF signal to a transmitting radio access card (RAC). The system may further comprise the transmitting RAC configured to, based on the operation mode, generate a second intermediate frequency (IF) signal based on the data or provide the first IF signal to a transmitting radio frequency unit (RFU). The receiving RAC may be further configured to receive the first IF signal from the receiving radio frequency unit (RFU), which may receive the first RF signal. Based on the Depending on the embodiment, the first RAC may be coupled to the receiving RFU configured to receive the first RF signal, and the second RAC may be coupled to the transmitting RFU configured to transmit the second RF signal. The receiving RFU may be one that can transmit an RF signal and receive an RF signal. Likewise, the transmitting RFU may be one that can receive an RF signal and transmit an RF signal.

For some embodiments, radio transmission and reception components comprise a radio frequency unit (RFU) coupled to an antenna, and a radio access card (RAC) coupled to the RFU. In some embodiments, the RFU includes an outdoor unit (ODU), and the RAC includes an indoor unit (IDU).

Various embodiments described herein are implemented in association with a device that operates as a transmitting device, receiving device, or both. Additionally, in some embodiments described herein, a computer system, or a computer program product, comprises a computer readable medium having computer program code (i.e., executable instructions) executable by a processor to perform various steps and operations described herein.

BRIEF DESCRIPTION OF THE DRAWINGS

The drawings are provided for purposes of illustration only and merely depict typical or example embodiments. These drawings are provided to facilitate the reader's understanding and shall not be considered limiting of the breadth, scope, or applicability various embodiments.

Figure 1:
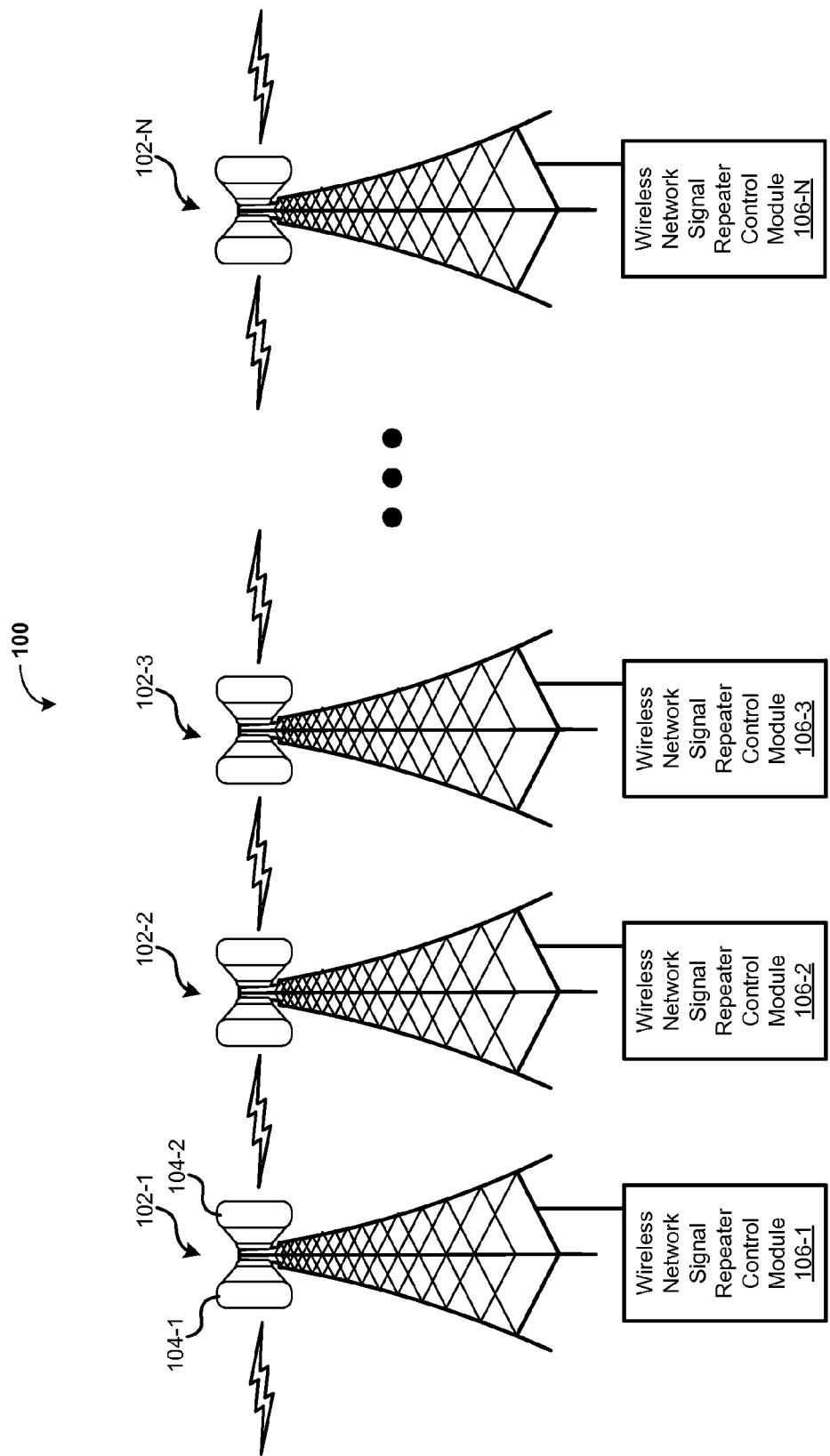
FIG. 1 depicts an example environment including a plurality of wireless network repeaters configured to relay a wireless signal in accordance with some embodiments.

The figures are not intended to be exhaustive or to limit the embodiments to the precise form disclosed. It should be understood that various embodiments may be practiced with modification and alteration.

DETAILED DESCRIPTION OF VARIOUS EMBODIMENTS

Various embodiments provide for systems, methods, or apparatuses relating to wireless repeaters in a wireless network, such as a microwave network. In some embodiments, systems, methods, or apparatuses monitor quality of a wireless link signal to automatically select an operation mode for a wireless repeater. For instance, systems, methods, or apparatuses may use quality estimation of a wireless signal (e.g., radio frequency signal), received over a wireless link (e.g., radio frequency link), by a wireless repeater to select between an intermediate frequency (IF) repeater mode, a regenerator mode, or the like for the wireless repeater. The systems, methods, or apparatuses may automatically switch the wireless repeater to the IF repeater mode when the quality of the wireless link signal meets a predetermined repeater mode condition (e.g., is at or above a predetermined threshold based on a TX spectrum mask), and may otherwise switch the wireless repeater to the regenerator mode whenever the quality of the wireless link signal meets a predetermined repeater mode condition (e.g., falls below the predetermined threshold). The IF repeater mode may meet the regulatory requirements, such as those of ANSI or ETSI. The regenerator mode may comprise a wireless repeater receiving a wireless link signal, and demodulating the wireless link signal to a baseband signal, which may be used to generate an intermediate frequency signal.

By way of such mode-switching on the wireless repeater, systems, methods, or apparatuses of some embodiments can increase availability of a wireless link repeated through the wireless repeater, and can facilitate low latency of the wireless link repeated through the wireless repeater. To protect against oscillation between operating modes (e.g., intermediate frequency (IF) repeater mode and regenerator mode), systems, methods, or apparatuses may utilize a guard timer, which may permit switching between operating modes after expiration of a time period. For some embodiments, a plurality of wireless repeaters are included in a wireless network where one or more wireless repeaters in the plurality can make autonomous decisions regarding their particular operating mode (e.g., IF repeater mode, regenerator mode, etc.).

According to some embodiments, a first radio access card (RAC) of a wireless network signal repeater provides an interface to a first radio frequency unit (RFU) of the wireless network signal repeater via a cable and provides signal modulation (e.g., QAM modulation) to facilitate carrying digital data as a wireless signal (e.g., radio frequency signal) over a wireless link (e.g., radio frequency link). During one operation mode, the first RAC may repeat an analog signal (e.g., intermediate frequency signal) received from the first RFU to a second radio access card (RAC) of the wireless network signal repeater, to which the first RAC is partnered. The analog signal received from the first RFU may be based on a first radio frequency (RF) signal received by the first RFU from a first antenna. The second RAC may upconvert the analog signal before providing the analog signal to a second radio frequency unit (RFU) of the wireless network signal repeater for transmission as a second radio frequency (RF) signal (e.g., via a second antenna).

If the wireless network signal repeater experiences signal issues, such as a loss of signal with respect to the first RF signal or signal degradation (e.g., due to fading activity) with respect to the first RF signal, the wireless network signal repeater may automatically switch to another mode of operation that can address such issues. For example, the wireless network signal repeater may switch (e.g., fallback) to a regenerator mode when a signal issue, such as signal loss or signal degradation, arises. In doing so, the wireless network signal repeater may avoid violating a transmission (TX) spectrum mask or regulatory requirement (e.g., ANSI or ETSI) meant to govern the wireless network signal repeater's operation. In some embodiments, when switching between operating modes, the wireless network signal repeater may cause a second radio frequency unit (RFU) coupled to a second radio access card (RAC) to mute and unmute (e.g., mute before the operating mode is switched and unmute once the switch has been completed).

A wireless network signal repeater may switch between operating modes based on analyzing the quality of a wireless link. The quality of a wireless link quality may be determined by monitoring a signal quality (e.g., signal quality indicator (SQI)) at a radio access card (RAC) of the wireless network signal repeater that is receiving an analog signal (e.g., intermediate frequency signal) from a first radio frequency unit (RFU) receiving a radio frequency (RF) signal over the wireless link. The first RAC of the wireless network signal repeater may be monitoring the signal quality in parallel with the first RAC providing the analog signal, or data generated based on (e.g., carried by) the analog signal, to a second radio access card (RAC) of the wireless network signal repeater. In determining whether to switch operating modes, the wireless network signal repeater may analyze the signal quality of the wireless link by evaluating whether the signal quality satisfies one or more conditions, such as meeting or surpassing a specific threshold. For instance, the wireless network signal repeater may compare the SQI against one or more fallback thresholds defined by the wireless network signal repeater's current configuration. Such conditions may be evaluated by the wireless network signal repeater according to a priority order.

In some embodiments, the conditions for switching operating modes include whether a current SQI of a wireless network signal repeater violates a transmission (TX) spectrum associated with the wireless network signal repeater, and whether the current SQI is worse than that of a fallback threshold, each of which may be evaluated in the foregoing order. For example, when the SQI violates the TX spectrum or when the current SQI falls at or below the fallback threshold, the wireless network signal repeater may switch from a first operating mode (e.g., IF repeater mode) to a second operating (e.g., a regenerator mode) that can address such conditions but may cause performance drawbacks with respect to the wireless network signal repeater (e.g., introduces latency with respect to data being carried by the wireless signal relayed through the wireless network signal repeater). This can be referred to as triggering a fallback to the second operating mode. When the SQI no longer violates the TX spectrum and when the current SQI is no longer worse than the fallback threshold (e.g., better than the fallback threshold by a specific amount, such X—Hysteresis units), the wireless repeater may switch back to the first operating mode. This can be referred to as recovery to the first operating mode.

For some embodiments, when one or more conditions for switching operating modes of a wireless network signal repeater have been satisfied, the operating modes are only permitted to be switched after a certain amount of time (e.g., guard time) has elapsed since the last operation mode switch. In doing so, some embodiments can avoid oscillation between two or more operating modes.

As used herein, under an intermediate frequency (IF) repeater mode, the wireless repeater will be understood to include a first radio access card (RAC) providing an analog signal, such as an intermediate frequency (IF) signal based on a received radio frequency (RF) signal, from a receiving radio frequency unit (RFU) to a second radio access card (RAC) along an analog signal path. The wireless repeater may further include the second RAC providing the analog signal to a transmitting radio frequency unit (RFU) configured to generate another radio frequency (RF) signal for transmission (e.g., to a another wireless network signal repeater, or an endpoint station). The wireless repeater mode may further include the second RAC upconverting the analog signal before providing the analog signal to the transmitting RFU.

As used herein, under a regenerator mode, the wireless repeater will be understood to include a first radio access card (RAC) generating data (e.g., digital data stream or one or more baseband signals) based on a first intermediate frequency (IF) signal that is generated by a receiving radio frequency unit (RFU) based on a received radio frequency (RF) signal. The wireless repeater may further include the first RAC providing the data to a second radio access card (RAC) along a digital path. The wireless repeater may further include the second RAC receiving the data and generating a second intermediate frequency (IF) signal based on the data (e.g., using the full modem functionality of the second RAC), and providing the resulting second IF signal to a transmitting radio frequency unit (RFU) configured to generate another radio frequency (RF) signal for transmission (e.g., to a another wireless network signal repeater, or an endpoint station).

Though various embodiments illustrated and described herein relate to receiving, processing, and transmitting radio signals in one direction, those skilled in the art will appreciate that for some embodiments, the components and operations described herein can easily be modified to receive, process, and transmit radio signals in the opposite direction or in both directions. Further, those skilled in the art will appreciate that the various embodiments illustrated and described herein are merely provided for illustrative purposes and that some embodiments illustrated and described herein exclude components or operations that may be otherwise present in other embodiments.

FIG. 1 depicts an example environment 100 including a plurality of wireless network repeaters configured to relay a wireless signal in accordance with some embodiments. In FIG. 1, the environment 100 comprises wireless network signal repeaters 102-1 through 102-N (hereafter, collectively referred to as the wireless network signal repeaters 102), and corresponding wireless network signal repeater control modules 106-1 through 106-N (hereafter, collectively referred to as the wireless network signal repeater control modules 106), one or more of which may facilitate or control operation of their respective wireless network signal repeater. As shown in FIG. 1, each of the wireless network signal repeater control modules 106 is communicatively coupled to a respective one of the wireless network signal repeaters 102. Those skilled in the art will appreciate that for some embodiments, the components, functionality, or configuration of the wireless network signal repeaters 102, the wireless network signal repeater control modules 106, the antennas (e.g., 104-1 and 104-2), or other components of the environment 100 may differ from what is described or depicted with respect to FIG. 1.

As used herein, the term module might describe a given unit of functionality that can be performed in accordance with one or more embodiments. As used herein, a module might be implemented utilizing any form of hardware, software, or a combination thereof. For example, one or more processors, controllers, ASICs, PLAs, PALs, CPLDs, DPLLs, FPGAs, logical components, software routines or other mechanisms might be implemented to make up a module. In implementation, the various modules described herein might be implemented as discrete modules or the functions and features described can be shared in part or in total among one or more modules. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Each of the wireless network signal repeaters 102 may be located at different physical locations (e.g., different geographic sites), which may facilitate relaying a wireless signal over great distances or around signal obstructions. Additionally, one or more of the wireless network signal repeater control modules 106 may be physically co-located with the respective wireless network repeater with which they operate.

As shown in FIG. 1, the wireless network signal repeater 102-1 comprises a first antenna 104-1 and a second antenna 104-2. For some embodiments, one or more of the wireless network signal repeaters 102 can comprise at least two antennas. Depending on the embodiment, one or more antennas of one of the wireless network signal repeaters 102 may be directed at an antenna of another one of the wireless network signal repeaters 102, thereby enabling a wireless link to be established between the two wireless network signal repeaters. Over such a wireless link, a wireless signal can be relayed between the two wireless network repeaters. Additionally, one or more antennas of one of the wireless network signal repeaters 102 may be directed at an antenna of a transmitting, a receiving, or a transceiver wireless network station, which may serve as an endpoint in a wireless network connection. In doing so, the wireless network signal repeater can establish a wireless link with such an endpoint station, and can relay a wireless signal to or from the endpoint station. Where one or more wireless network signal repeaters 102 are utilized in relaying a wireless signal between two endpoints in a wireless network connection, each of those wireless network signal repeaters may be considered a hop in the wireless network connection.

In some instances, only one of the wireless network signal repeaters 102 may be utilized to relay a wireless signal between two endpoints (e.g., a transmitting wireless network station and a receiving wireless network station) in a wireless connection. Additionally, in some instances, one or more of the wireless network signal repeaters 102 may be utilized in a one-to-many wireless network connection (e.g., a multipoint wireless network connection).

For some embodiments, one or more of the wireless network signal repeater control modules 106 are configured to control or facilitate the operation of their respective wireless network signal repeater in accordance with one or more systems, methods, or apparatuses described herein. For instance, the wireless network signal repeater control module 106-2 may control the operation of the wireless network signal repeater 102-2 such that the wireless network signal repeater 102-2 receives a first radio frequency (RF) signal from the wireless network signal repeater 102-1 and determines a signal quality based on the first RF signal, the signal quality is analyzed based on a set of parameters (e.g., conditions or thresholds). Subsequently, the wireless network signal repeater control module 106-2 may select an operation mode for the wireless network signal repeater 102-2 and, based on the selected operation mode, the wireless network signal repeater 102-2 may generate a second radio frequency (RF) signal based on the first RF signal. Thereafter, the wireless network signal repeater 102-2 may transmit the second RF signal to the wireless network signal repeater 102-3. In this way, the wireless repeater relays the first RF signal from the wireless network signal repeater 102-1 to the wireless network signal repeater 102-3 as the second RF signal.

Figure 2:
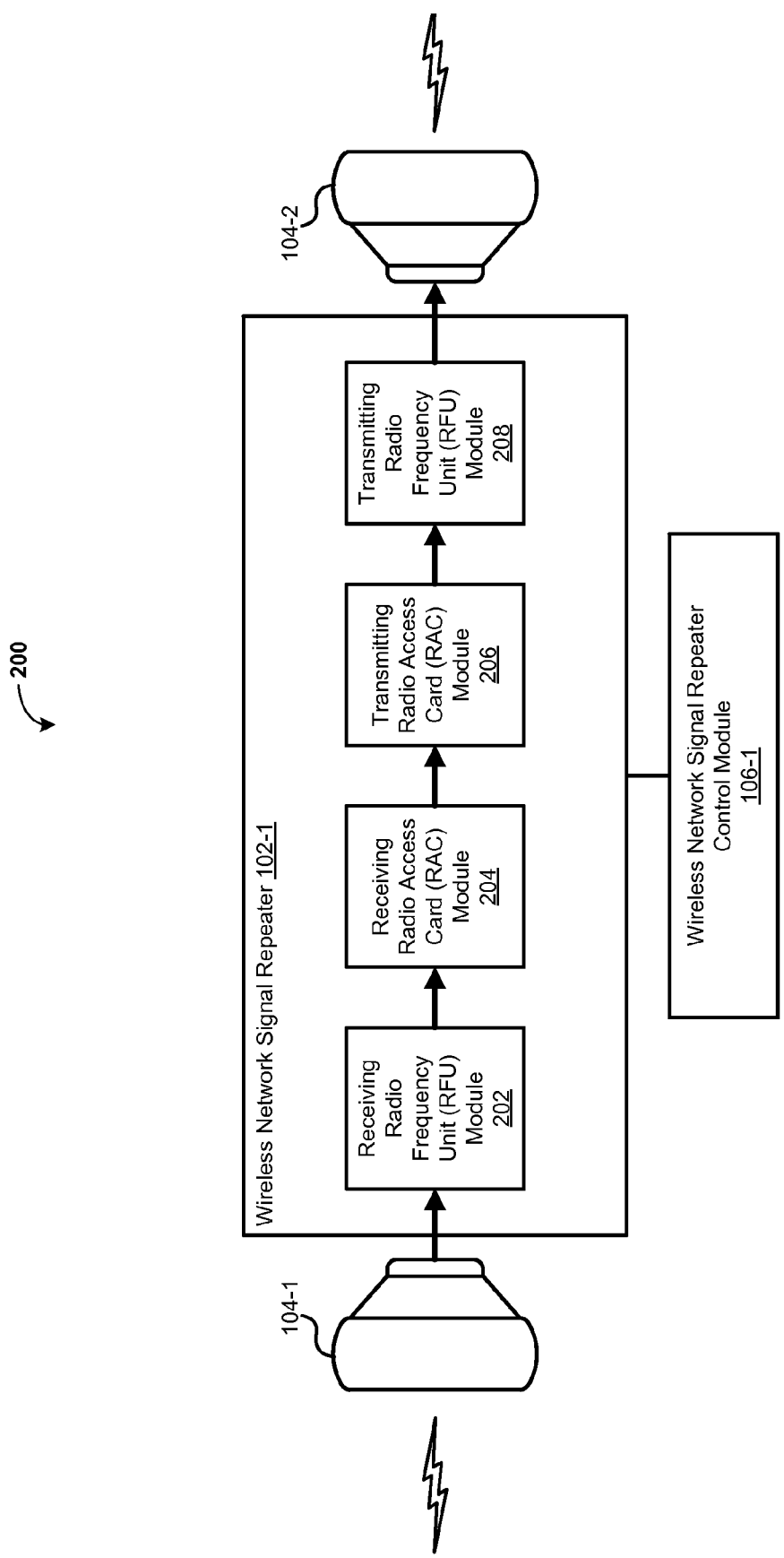
FIG. 2 depicts an example wireless network signal repeater system in accordance with some embodiments.

FIG. 2 depicts an example wireless network signal repeater system 200 in accordance with some embodiments. In FIG. 2, the wireless network signal repeater system 200 comprises the antenna 104-1, the wireless network signal repeater 102-1, the wireless network signal repeater control module 106-1, and the antenna 104-2. As shown in FIG. 2, the wireless network signal repeater 102-1 comprises a receiving radio frequency unit (RFU) 202 coupled to the antenna 104-1, a receiving radio access card (RAC) 204 coupled to the receiving RFU 202, a transmitting radio access card (RAC) 206 coupled to the receiving RAC 204, a transmitting radio frequency unit (RFU) 208 coupled to the transmitting RAC 206, and the antenna 104-2 coupled to the transmitting RFU 208. For some embodiments, the receiving RFU 202 is an outdoor unit (ODU), the receiving RAC 204 is an indoor unit (IDU), and the receiving RFU 202 and the receiving RAC 204 may be implemented as a split-mount system. Similarly, in some embodiments, the transmitting RFU 208 is an ODU, the transmitting RAC 206 is an IDU, and the transmitting RFU 208 and the transmitting RAC 206 may be implemented a split-mount system. Depending on the embodiment, the receiving RFU 202 and the receiving RAC 204 may be configured to receive microwave or millimeter wave radio frequency (RF) signals, and the transmitting RFU 208 and the transmitting RAC 206 may be configured to transmit microwave or millimeter wave RF signals. Those skilled in the art will appreciate that for some embodiments, the components, functionality, or configuration of the wireless network signal repeater 102-1, the antennas 104-1 and 104-2, or the wireless network signal repeater control module 106-1 may differ from what is described or depicted with respect to FIG. 2. For instance, various components or functionality of the wireless network signal repeater control module 106-1 may include or incorporated into various components of the wireless network signal repeater 102-1, such as one or more of the receiving RAC 206, the transmitting RAC 206, the receiving RFU 204, and the transmitting RFU 208.

According to some embodiments, the wireless network signal repeater 102-1 may receive a first radio frequency (RF) signal through the receiving RFU 202. The receiving RFU 202 may generate a first intermediate frequency (IF) signal based on the first RF signal, and may do so by downconverting the first RF signal to the first IF signal. Subsequently, the receiving RFU 202 may provide the first IF signal to the receiving RAC 204.

The receiving RAC 204 may determine, or assist in the determination of, the signal quality of the first RF signal based on the first IF signal generated by the receiving RFU 202. The wireless network signal repeater control module 106-1 may analyze the determined signal quality of the first RF signal in view of a set of parameters (e.g., conditions, such as thresholds) and based on such analysis, select one or more operating modes, from a set of operating modes, for the wireless network signal repeater 102-1.

For some embodiments, under the intermediate frequency (IF) repeater mode, the receiving RAC 204 receives the first IF signal from the receiving RFU 202, the receiving RAC 204 may provide the first IF signal to the transmitting RAC 206. Under the intermediate frequency (IF) repeater mode, the wireless network signal repeater control module 106-1 may cause the transmitting RAC 206 to provide the first IF signal to the transmitting RFU 208. In some embodiments, the transmitting RAC 206 upconverts the first IF signal before the first IF signal is provided to the transmitting RFU 208. The transmitting RFU 208 may generate a second radio frequency (RF) signal based on the first IF signal, and may transmit the second RF signal through the antenna 104-2.

For some embodiments, under the regenerator mode, the receiving RAC 204 receives the first IF signal from the receiving RFU 202, the receiving RAC 204 generates data (e.g., digital data stream or baseband signals), and the receiving RAC 204 provides the data to the transmitting RAC 206. Under the regenerator mode, the wireless network signal repeater control module 106-1 may cause the transmitting RAC 206 to generate a second intermediate frequency (IF) signal based on the data, which the transmitting RAC 206 may provide to the transmitting RFU 208. The transmitting RFU 208 may generate the second RF signal based on the second IF signal, and may transmit the second RF signal through the antenna 104-2.

Figure 3:
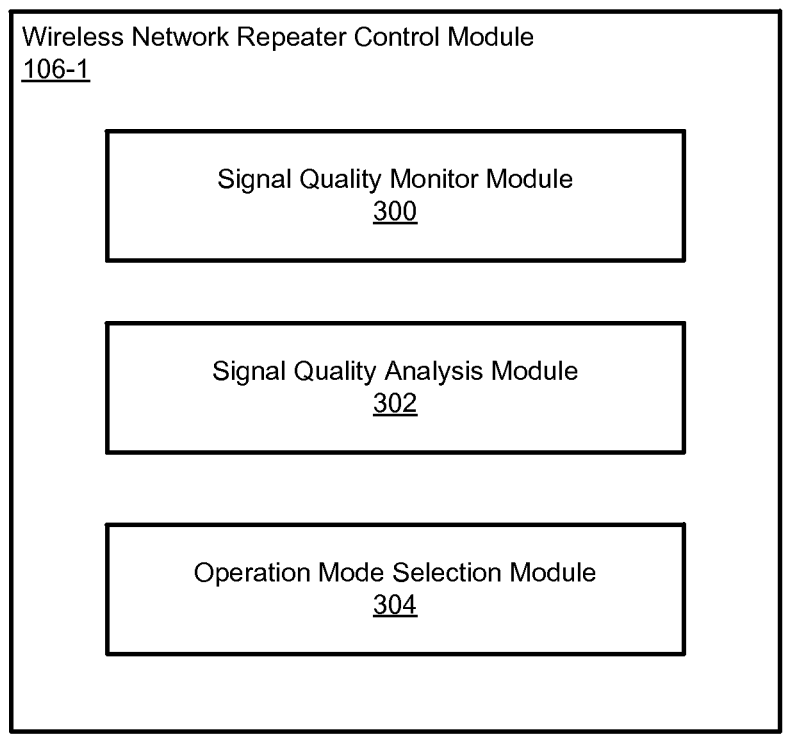
FIG. 3 depicts an example wireless network signal repeater control module in accordance with some embodiments.

FIG. 3 depicts the wireless network signal repeater control module 106-1 in accordance with some embodiments. In FIG. 3, the wireless network signal repeater control module 106-1 comprises a signal quality monitor module 300, a signal quality analysis module, and an operation mode selection module 304. Those skilled in the art will appreciate that for some embodiments, the components, functionality, or configuration of the wireless network signal repeater control module 106-1 may differ from what is described or depicted with respect to FIG. 3.

The signal quality monitor module 300 may be configured to determine, or facilitate the determination of, a signal quality of a radio frequency (RF) signal received by a wireless network signal repeater (e.g., the wireless network signal repeater 102-1). In some embodiments, the wireless network signal repeater 102-1 determines the signal quality of the RF signal (e.g., based on an intermediate frequency (IF) signal generated from the RF signal), and the signal quality monitor module 300 determines the signal quality of the RF signal by obtaining the determined signal quality from the wireless network signal repeater.

The signal quality analysis module 302 may be configured to analyze, or facilitate the analysis of, the signal quality determined (e.g., obtained) by the signal quality monitor module 300. Depending on the embodiment, the signal quality analysis module 302 may analyze the signal quality determined signal quality in view of a set of parameters. For instance, the signal quality analysis module 302 may evaluate whether the determined signal quality (e.g., SQI, such as RSSI, SNR, or BER) satisfy one or more conditions included in the set of parameters. The signal quality analysis module 302 may, for instance, evaluate whether the signal quality meets or surpasses a specific threshold. In another instance, the signal quality analysis module 302 may compare the SQI against one or more fallback thresholds defined by the wireless network signal repeater's current configuration. The signal quality analysis module 302 may evaluate a set of parameters (e.g., conditions) according to a priority order.

The operation mode selection module 304 may be configured to select, or facilitate the selection of, an operation mode for the wireless network signal repeater, and may do so based on the analysis of the determined signal quality. The operation mode selection module 304 may, for example, select between an intermediate frequency (IF) repeater mode, a regenerator mode, or the like for the wireless network signal repeater. For instance, where the determined signal quality is at or above a predetermined threshold (e.g., based on TX spectrum mask), the operation mode selection module 304 may select or maintain the operation mode of the wireless network signal repeater as the IF repeater mode. The operation mode selection module 304 may switch the wireless network signal repeater to the regenerator mode when the determined signal quality falls below the predetermined threshold. As described herein, the IF repeater mode may meet the regulatory requirements, such as those of ANSI or ETSI. As also described herein, the regenerator mode may comprise a wireless network signal repeater receiving a RF signal, demodulating the RF signal to data (e.g., baseband signals), modulating the data to an IF signal that can be upconverted to an RF signal representing the received RF signal, thereby relaying the received RF signal.

Figure 4:
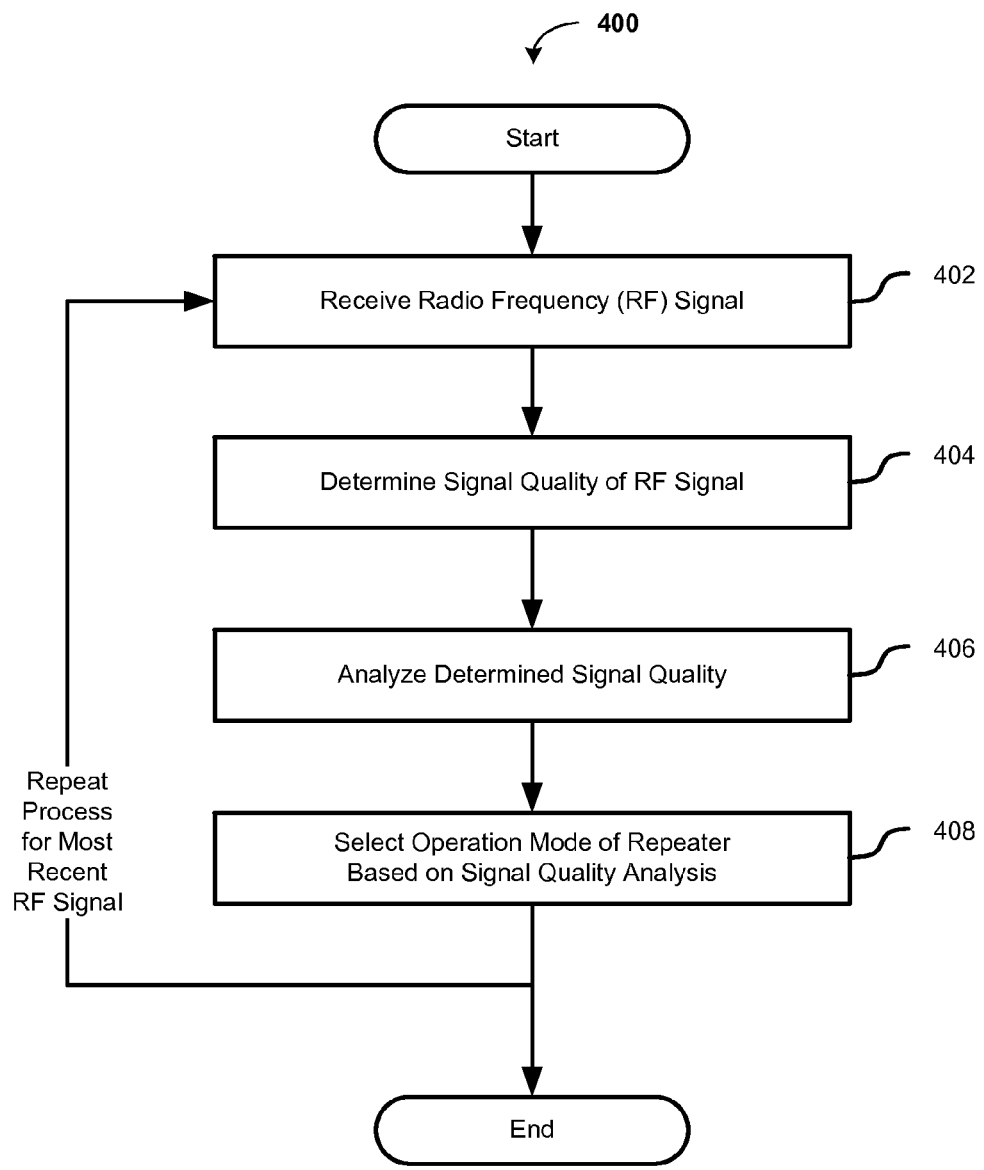
FIG. 4 is a flow diagram of an example method for operating a wireless network repeater in accordance with some embodiments.

FIG. 4 is a flow diagram of an example method 400 for operating a wireless network repeater in accordance with some embodiments. According to some embodiments, the method 400 is performed by the wireless network signal repeater 102-1 and the wireless network signal repeater control module 106-1. By performing the method 400, the wireless network signal repeater 102-1 may switch between operation modes based on signal quality, and may facilitate use of the wireless network signal repeater 102-1 in a wireless signal path (e.g., in a point-to-point wireless connection) while maintaining low latency in the wireless signal path, enabling increased availability of the wireless signal path (e.g., addressing signal degradation or loss of signal), and maintain wireless regulatory requirements (e.g., TX spectrum mask).

The method 400 may begin at step 402, the wireless network signal repeater 102-1 receiving a radio frequency (RF) signal through the antenna 104-1. At step 404, wireless network signal repeater control module 106-1 may control the operation of the wireless network signal repeater 102-1 such that the wireless network signal repeater 102-1 determines a signal quality based of the RF signal. For some embodiments, the signal quality of the RF signal may be determined based on an intermediate frequency (IF) signal generated from the RF signal.

At step 406, the wireless network signal repeater control module 106-1 may analyze the determined signal quality, and may do so in view of set of parameters, such as conditions relating (e.g., thresholds) to signal quality of the RF signal (e.g., SQI). At step 408, the wireless network signal repeater control module 106-1 may select an operation mode for the wireless network signal repeater 102-1.

Subsequent to step 408, the method 400 may return to step 402, where the wireless network signal repeater 102-1 receives the most current radio frequency (RF) signal. The method 400 may continue to steps 404 through 408. Alternatively, after step 408, the method 400 may conclude, with the wireless network signal repeater 102-1 relaying the RF signal through the wireless network signal repeater 102-1 (e.g., as another RF signal) in accordance with the operation mode selected.

Though the steps of the method 400 may be depicted and described in a certain order, those skilled in the art will appreciate that the order in which the steps are performed may vary between different embodiments. Additionally, those skilled in the art will appreciate that the components described above with respect to the method 400 are merely examples of components that may be used with the method 400, and that other components may also be utilized in some embodiments.

Figure 5:
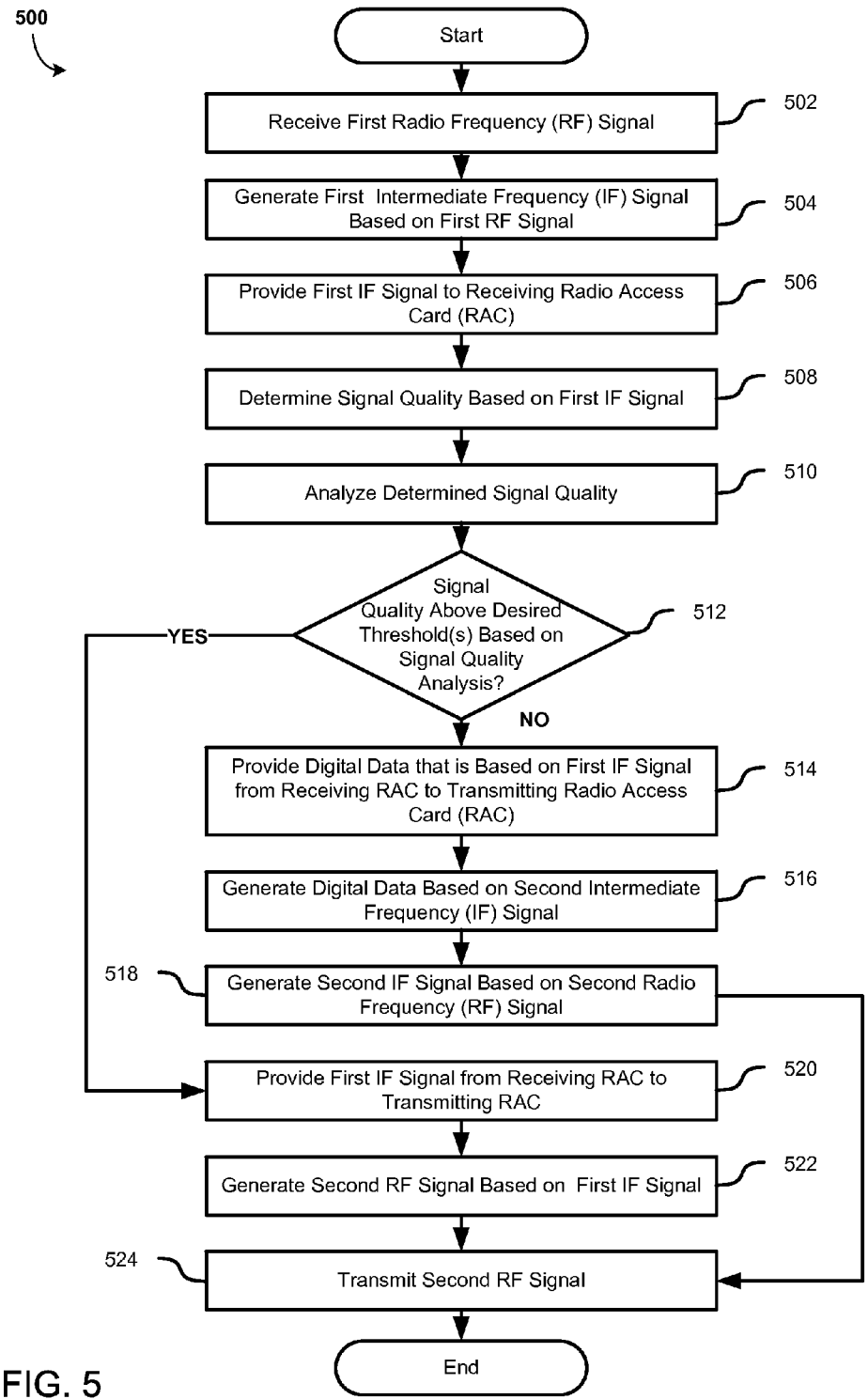
FIG. 5 is a flow diagram of an example method for operating a wireless network repeater in accordance with some embodiments.

FIG. 5 is a flow diagram of an example method 500 for operating a wireless network repeater in accordance with some embodiments. According to some embodiments, the method 500 is performed by the wireless network signal repeater 102-1 and the wireless network signal repeater control module 106-1.

The method 500 may being at step 502, with the wireless network signal repeater 102-1 may receive a first radio frequency (RF) signal through the receiving RFU 202. The receiving RFU 202 may receive the first RF signal through the antenna 104-1. At step 504, the receiving RFU 202 may generate a first intermediate frequency (IF) signal based on the first RF signal, and may do so by downconverting the first RF signal to the first IF signal. At step 506, the receiving RFU 202 may provide the first IF signal to the receiving RAC 204. At step 508, the receiving RAC 204 may determine the signal quality of the first RF signal based on the first IF signal generated by the receiving RFU 202. At step 510, the wireless network signal repeater control module 106-1 may analyze the determined signal quality of the first RF signal and may do so in view of a set of parameters, such as conditions (e.g., thresholds). For instance, at step 512, the wireless network signal repeater control module 106-1 may evaluate, based on analysis of the signal quality, whether the signal quality is above one or more desired thresholds. If the signal quality is above the thresholds, the method 500 may continue to step 520, otherwise the method 500 may continue to step 514. In some embodiments, continuing to step 520 represents the wireless network signal repeater control module 106-1 selecting one operating mode (e.g., IF repeater mode), and continue to step 514 represents the wireless network signal repeater control module 106-1 selecting another operating mode (e.g., regenerator mode).

At step 514, the wireless network signal repeater control module 106-1 may cause the receiving RAC 204 to provide digital data, which is (e.g., generated) based on the first IF signal, to the transmitting RAC 206. The digital data may be generated by the receiving RAC 204 based on the first IF signal. At step 516, the wireless network signal repeater control module 106-1 may cause the transmitting RAC 206 to generate the second intermediate frequency (IF) signal based on the digital data. At step 518, the transmitting RFU 208 may generate a second radio frequency (RF) signal based on the second IF signal, where the second RF signal is intended to represent the first RF signal being relayed through the wireless network signal repeater 102-1. The transmitting RFU 208 may generate the second RF signal based on the second IF signal by upconverting the second IF signal to the second RF signal.

At step 520, the wireless network signal repeater control module 106-1 can cause the receiving RAC 204 to provide the first IF signal (e.g., repeat the first IF signal to) the transmitting RAC 206. At step 522, the wireless network signal repeater control module 106-1 may cause the transmitting RFU 208 to generate the second RF signal based on the first IF signal. The transmitting RFU 208 may generate the second RF signal based on the first IF signal by upconverting the first IF signal to the second RF signal.

From step 518 or step 524, the method 500 may continue to step 524 with the transmitting RFU 208 transmitting the second RF signal, generated by the transmitting RFU 208, through the antenna 104-2.

Though the steps of the method 500 may be depicted and described in a certain order, those skilled in the art will appreciate that the order in which the steps are performed may vary between different embodiments. Additionally, those skilled in the art will appreciate that the components described above with respect to the method 500 are merely examples of components that may be used with the method 500, and that other components may also be utilized in some embodiments.

Figure 6:
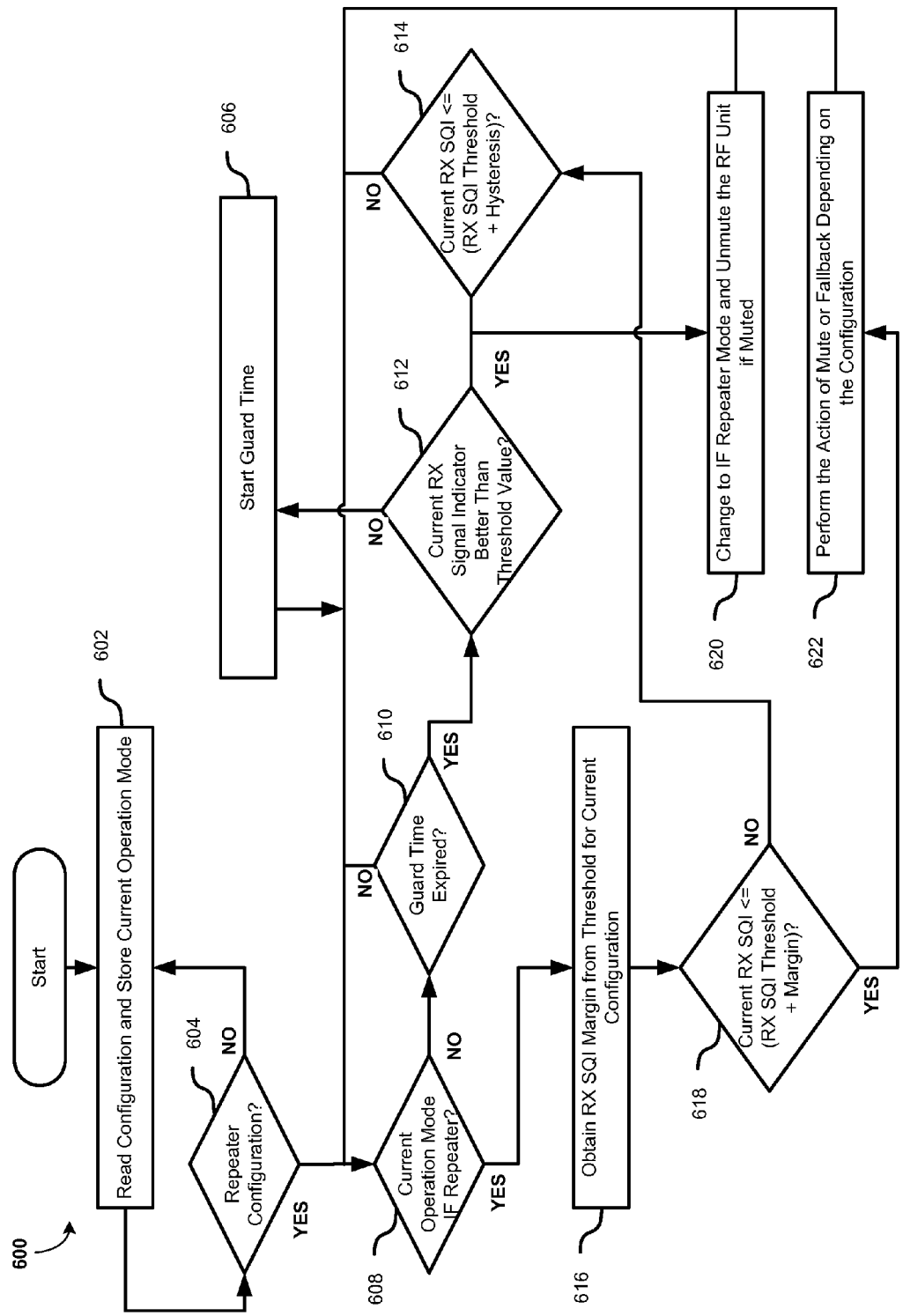
FIG. 6 is a flow diagram of an example method for operating a wireless network repeater in accordance with some embodiments.

FIG. 6 is a flow diagram of an example method 600 for operating a wireless network repeater in accordance with some embodiments. According to some embodiments, the method 600 is performed by the wireless network signal repeater 102-1 and the wireless network signal repeater control module 106-1. The method 600 may begin at step 602, with the wireless network signal repeater 102-1, or the wireless network signal repeater control module 106-1, reading a configuration of the wireless network signal repeater 102-1 and storing the current operation mode of the wireless network signal repeater 102-1. At step 604, if it is determined that the configuration is a repeater configuration, the method 600 continues to step 608, otherwise the method 600 continues to step 602. At step 608, if the current operation mode is the IF repeater mode, the method 600 proceeds to step 616, otherwise the method 600 proceeds to step 610.

At step 610, if the guard time has expired, the method 600 continues to step 612, otherwise the method 600 returns to step 608. At step 612, if the current receive (RX) signal indicator is better than a threshold value, the method continues to step 620, otherwise the method 600 continues to step 606. At step 606, the wireless network signal repeater 102-1, or the wireless network signal repeater control module 106-1, may start a guard time, which can help avoid oscillation between operation modes. After step 606, the method 600 returns to step 608.

At step 616, the wireless network signal repeater 102-1, or the wireless network signal repeater control module 106-1, may obtain a receive (RX) signal quality indicator (SQI) margin from threshold for the current configuration of the wireless network signal repeater 102-1. At step 618, if a current RX SQI of the wireless network signal repeater 102-1 is less than or equal to the sum of a RX SQI threshold and the RX SQI marge from threshold, the method 600 continues to step 622, otherwise the method continues to step 614. At step 614, if the current RX SQI is less than or equal to the sum of the RX SQI threshold and the hysteresis, the method 600 continues to step 620, otherwise the method 600 returns to step 608.

At step 620, the wireless network signal repeater control module 106-1 may cause the wireless network signal repeater 102-1 to change to IF repeater mode and may further cause unmuting of a radio frequency unit (e.g., transmitting RFU) of the wireless network signal repeater 102-1 (e.g., after or concurrent with the change to IF repeater mode). At step 622, the wireless network signal repeater control module 106-1 may cause the wireless network signal repeater 102-1 to mute a radio frequency unit (e.g., transmitting RFU) of the wireless network signal repeater 102-1 and may further cause the wireless network signal repeater 102-1 to another operating mode, such as the regenerator mode, which may address the current RX SQI being less than the less than or equal to the sum of a RX SQI threshold and the RX SQI marge from threshold.

Though the steps of the method 600 may be depicted and described in a certain order, those skilled in the art will appreciate that the order in which the steps are performed may vary between different embodiments. Additionally, those skilled in the art will appreciate that the components described above with respect to the method 600 are merely examples of components that may be used with the method 600, and that other components may also be utilized in some embodiments.

Figure 7:
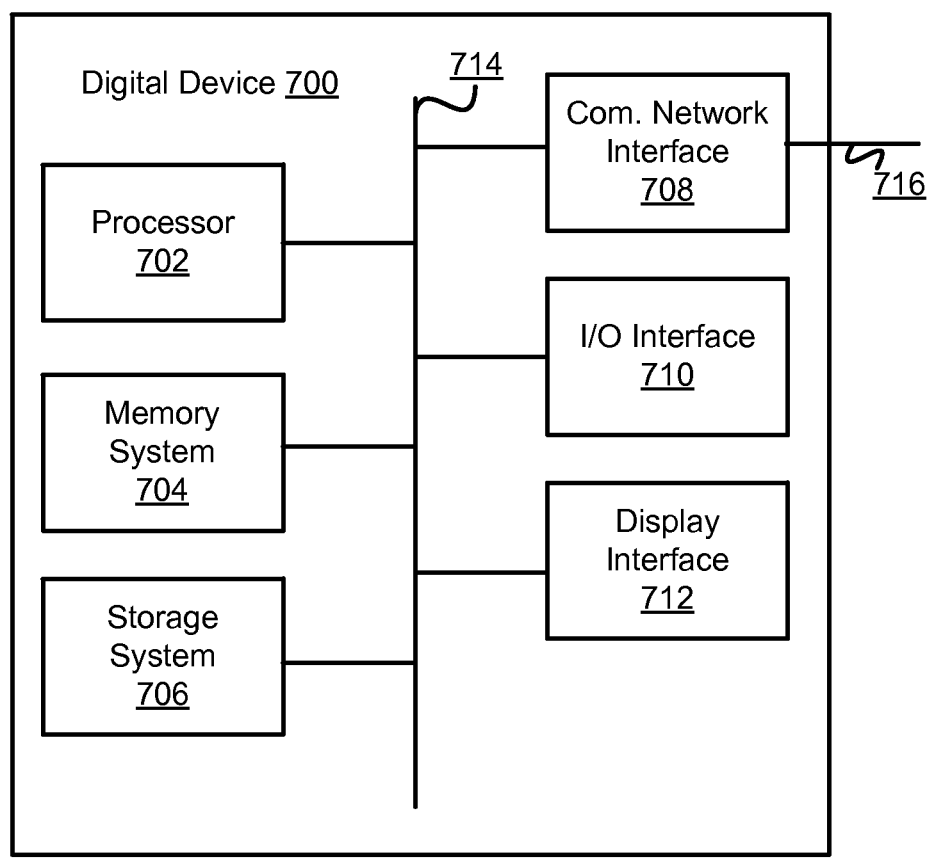
FIG. 7 depicts an example digital device according to some embodiments.

FIG. 7 depicts an example digital device 700 according to some embodiments. The digital device 700 comprises a processor 702, a memory system 704, a storage system 706, a communication network interface 708, an I/O interface 710, and a display interface 712 communicatively coupled to a bus 714. The processor 702 may be configured to execute executable instructions (e.g., programs). In some embodiments, the processor 702 comprises circuitry or any processor capable of processing the executable instructions.

The memory system 704 is any memory configured to store data. Some examples of the memory system 704 are storage devices, such as RAM or ROM. The memory system 704 may comprise the RAM cache. In various embodiments, data is stored within the memory system 704. The data within the memory system 704 may be cleared or ultimately transferred to the storage system 706.

The storage system 706 is any storage configured to retrieve and store data. Some examples of the storage system 706 are flash drives, hard drives, optical drives, and/or magnetic tape. In some embodiments, the digital device 700 includes a memory system 704 in the form of RAM and a storage system 706 in the form of flash data. Both the memory system 704 and the storage system 706 comprise computer readable media that may store instructions or programs that are executable by a computer processor including the processor 702.

The communication network interface (com. network interface) 708 may be coupled to a data network via the link 716. The communication network interface 708 may support communication over an Ethernet connection, a serial connection, a parallel connection, or an ATA connection, for example. The communication network interface 708 may also support wireless communication (e.g., 802.11a/b/g/n, WiMAX). It will be apparent to those skilled in the art that the communication network interface 708 may support many wired and wireless standards.

The optional input/output (I/O) interface 710 is any device that receives input from the user and output data. The optional display interface 712 is any device that may be configured to output graphics and data to a display. In one example, the display interface 712 is a graphics adapter.

It will be appreciated by those skilled in the art that the hardware elements of the digital device 700 are not limited to those depicted in FIG. 7. A digital device 700 may comprise more or less hardware elements than those depicted. Further, hardware elements may share functionality and still be within various embodiments described herein. In one example, encoding and/or decoding may be performed by the processor 702 and/or a co-processor located on a GPU.

One or more functions may be stored on a storage medium such as a computer readable medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with some embodiments. Those skilled in the art are familiar with instructions, processor(s), and storage medium.

Various embodiments are described herein as examples. It will be apparent to those skilled in the art that various modifications may be made and other embodiments can be used.

We claim:

1. A method comprising:
   receiving a first radio frequency (RF) signal at a wireless repeater, the first RF signal communicated from a transmitter over a communications path toward a receiver;
   determining a first signal quality value of the first RF signal at a first time;
   comparing the first signal quality value with a first threshold signal quality value to determine if the first RF signal has degraded to a first signal quality level;
   switching the wireless repeater to a regenerator repeater mode when the comparing the first signal quality value with the first threshold signal quality value indicates the first RF signal has degraded to the first signal quality level, the regenerator repeater mode improving one or more characteristics of the first RF signal, whereby latency is introduced into the communications path as the first RF signal is communicated toward the receiver;
   determining a second signal quality value of the first RF signal at a second time, the second time being subsequent to the first time;
   comparing the second signal quality value with the first threshold signal quality value to determine if the first RF signal has improved to a second signal quality level; and
   switching the wireless repeater to a non-regenerator repeater mode when the comparing the second signal quality value with the first threshold signal quality value indicates the first RF signal has improved to the second signal quality level.

2. The method of claim 1, further comprising generating a second radio frequency (RF) signal at the wireless repeater based on an operation mode, the second RF signal being based on the first RF signal.

3. The method of claim 1, wherein a first radio access card (RAC) of the wireless repeater receives an intermediate frequency (IF) signal from a receiving radio frequency unit (RFU) that generates the IF signal based on the first RF signal.

4. The method of claim 1, wherein a first radio access card (RAC) of the wireless repeater receives a first intermediate frequency (IF) signal from a receiving radio frequency unit (RFU) that generates the first IF signal based on the first RF signal, the first RAC generates data based on the first IF signal based on an operation mode, a second radio access card (RAC) of the wireless repeater generates a second intermediate frequency (IF) signal based on the data, and a transmitting radio frequency unit (RFU) generates a second RF signal based on the second IF signal.

5. The method of claim 1, wherein a first radio access card (RAC) of the wireless repeater receives an intermediate frequency (IF) signal from a receiving radio frequency unit (RFU) that generates the IF signal based on the first RF signal, the first RAC provides the IF signal to a second radio access card (RAC) of the wireless repeater based on an operation mode, the second RAC provides the IF signal to a transmitting radio frequency unit (RFU), and the transmitting RFU generates a second RF signal based on the IF signal.

6. The method of claim 1, wherein the determining the first signal quality value of the first RF signal comprises monitoring a signal quality indicator (SQI) associated with the first RF signal.

7. The method of claim 6, where the SQI comprises radio signal level (RSL), a signal-to-noise ratio (SNR), or a bit error rate (BER).

8. The method of claim 6, wherein the first signal quality value is compared with the first threshold signal quality value to determine if the SQI violates a transmitter (TX) spectrum mask out.

9. The method of claim 6, wherein the first signal quality value is compared with the first threshold signal quality value to determine if the SQI is above or below a quality threshold.

10. The method of claim 1, wherein an operation mode comprises a first radio access card (RAC) of the wireless repeater providing an intermediate frequency (IF) signal to a second radio access card (RAC) of the wireless repeater, the first RAC receiving the IF signal from a receiving radio frequency unit (RFU) that generates the IF signal based on the first RF signal.

11. The method of claim 1, wherein an operation mode comprises a first radio access card (RAC) of the wireless repeater providing data to a second radio access card (RAC) of the wireless repeater, the first RAC generating the data based on an intermediate frequency (IF) signal.

12. The method of claim 1, further comprising muting a transmitting radio frequency unit (RFU) of the wireless repeater.

13. The method of claim 1, further comprising unmuting a transmitting radio frequency unit (RFU) of the wireless repeater.

14. The method of claim 1, further comprising:
  determining a third signal quality value of the first RF signal at a third time;
  comparing the third signal quality value with a second threshold signal quality value to determine if the first RF signal has improved to a third signal quality level; and
  switching the wireless repeater to a non-repeater mode when the comparing the third signal quality value with the second threshold signal quality value indicates the first RF signal has improved to the third signal quality level.

15. A system comprising:
  means for receiving a first radio frequency (RF) signal at a wireless repeater, the first RF signal communicated from a transmitter over a communications path toward a receiver;
  means for determining first signal quality value of the first RF signal at a first time;
  means for comparing the first signal quality value with a first threshold signal quality value to determine if the first RF signal has degraded to a first signal quality level;
  means for switching the wireless repeater to a regenerator repeater mode when the comparing the first signal quality value with the first threshold signal quality value indicates the first RF signal has degraded to the first signal quality level, the regenerator repeater mode improving one or more characteristics of the first RF signal, whereby latency is introduced into the communications path as the first RF signal is communicated toward the receiver;
  means for determining a second signal quality value of the first RF signal at a second time, the second time being subsequent to the first time;
  means for comparing the second signal quality value with the first threshold signal quality value to determine if the first RF signal has improved to a second signal quality level; and
  means for switching the wireless repeater to a non-regenerator repeater mode when the comparing the second signal quality value with the first threshold signal quality value indicates the first RF signal has improved to the second signal quality level.

16. A system comprising:
  a wireless repeater including a receiving radio access card (RAC) configured to receive a first intermediate frequency (IF) signal and determine a first signal quality value of a first radio frequency (RF) signal based on the first IF signal, the first RF signal communicated from a transmitter over a communications path toward a receiver;
  a wireless repeater controller configured to:
    compare the first signal quality value with a first threshold signal quality value to determine if the RF signal has degraded to a first signal quality level,
    switch the wireless repeater to a regenerator repeater mode when the comparing the first signal quality value with the first threshold signal quality value indicates the RF signal has degraded to the first signal quality level, the regenerator repeater mode improving one or more characteristics of the RF signal, whereby latency is introduced into the communications path as the RF signal is communicated toward the receiver,
    determine a second signal quality value of the RF signal at a second time, the second time being subsequent to the first time,
    compare the second signal quality value with the first threshold signal quality value to determine if the RF signal has improved to a second signal quality level, and
    switch the wireless repeater to a non-regenerator repeater mode when the comparing the second signal quality value with the first threshold signal quality value indicates the RF signal has improved to the second signal quality level, the receiving RAC further configured to generate data based on the first IF signal and provide the first IF signal to a transmitting radio access card (RAC) of the wireless repeater; and the transmitting RAC configured to, based on an operation mode, generate a second intermediate frequency (IF) signal based on the data or provide the first IF signal to a transmitting radio frequency unit (RFU).

17. The system of claim 16, wherein the receiving RAC is further configured to receive the first IF signal from a receiving radio frequency unit (RFU).

18. The system of claim 16, wherein the transmitting RFU is configured to generate a second radio frequency (RF) signal based on the first IF signal or the second IF signal.

19. The system of claim 16, wherein the determining the first signal quality value of the first RF signal comprises monitoring a signal quality indicator (SQI) associated with the first RF signal.

20. The system of claim 19, where the SQI comprises radio signal level (RSL), a signal-to-noise ratio (SNR), or a bit error rate (BER).

21. The system of claim 19, wherein the first signal quality value is compared with the first threshold signal quality value to determine if the SQI violates a transmitter (TX) spectrum mask out.

22. The system of claim 19, wherein the first signal quality value is compared with the first threshold signal quality value to determine if the SQI is above or below a quality threshold.

23. The system of claim 16, where the wireless repeater controller is further configured to mute the transmitting RFU.

24. The system of claim 16, where the wireless repeater controller is further configured to unmute the transmitting RFU.

* * * * *